(12) United States Patent
Bazzica

(10) Patent No.: US 6,227,835 B1
(45) Date of Patent: May 8, 2001

(54) MACHINE FOR PRODUCING PARTS OF FOAMED PLASTIC MATERIAL

(75) Inventor: Carlo Bazzica, Foligno (IT)

(73) Assignee: Bazzica Engineering Di Carlo Bazzica & C. S.a.s., Borgo Trevi (IT)

( * ) Notice: Subject to any disclaimer, the term of this patent is extended or adjusted under 35 U.S.C. 154(b) by 0 days.

(21) Appl. No.: 09/328,418

(22) Filed: Jun. 9, 1999

(30) Foreign Application Priority Data

Jun. 9, 1998 (IT) .......................................... TO98A000507

(51) Int. Cl.[7] .................................................. B29C 33/32
(52) U.S. Cl. ........................... 425/3; 425/338; 425/450.1; 425/451.9; 425/817 R
(58) Field of Search ............................ 425/3, 4 R, 450.1, 425/451, 451.9, 453, DIG. 33, 817 R, 338

(56) References Cited

U.S. PATENT DOCUMENTS

| 3,590,418 | 7/1971 | Hoeschel . | |
|---|---|---|---|
| 3,844,524 | * 10/1974 | Fisher et al. | 425/450.1 |
| 3,887,312 | * 6/1975 | Seary | 425/3 |
| 4,648,825 | * 3/1987 | Heil et al. | 425/451 |

FOREIGN PATENT DOCUMENTS

| 0 544 903 | 6/1993 | (EP) . |
| 0 832 728 | 4/1998 | (EP) . |
| 2 104 439 | 3/1983 | (GB) . |

* cited by examiner

Primary Examiner—James P. Mackey
(74) Attorney, Agent, or Firm—Venable; George H. Spencer; Gabor J. Kelemen

(57) ABSTRACT

A machine for producing parts of foamed plastic material, wherein a gantry-type frame supports a fixed half-mold, and a carriage from which is suspended a movable half-mold and which is movable along the frame to impart to the movable half-mold an approach movement towards, and a parting movement from, the fixed half-mold; the movable half-mold being locked to the fixed half-mold, in a position closing a mold for injecting foamed plastic material, by a number of electromagnets interposed between the two half-molds.

9 Claims, 6 Drawing Sheets

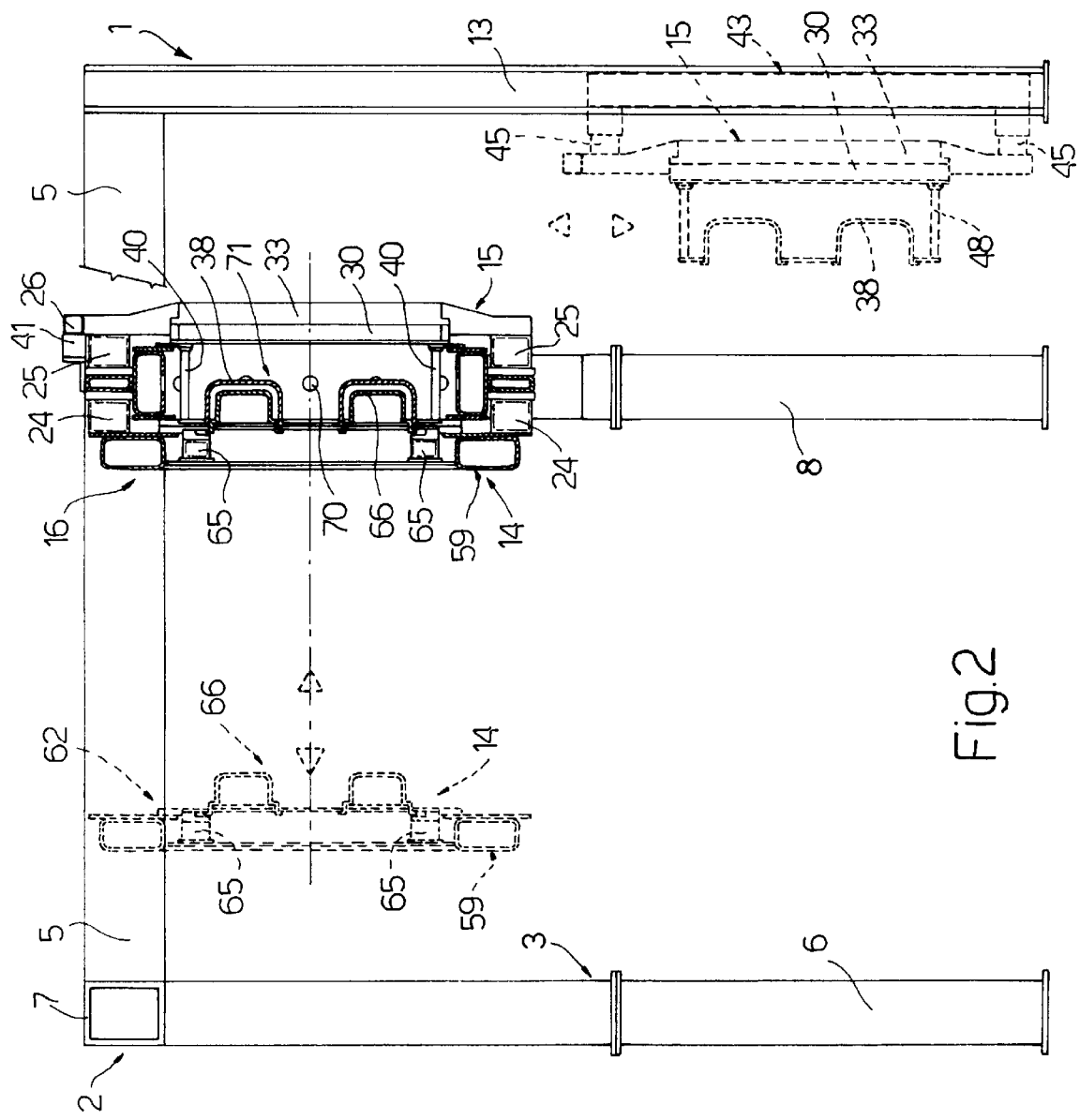

MACHINE FOR PRODUCING PARTS OF FOAMED PLASTIC MATERIAL

The present invention relates to a machine for producing parts of foamed plastic material.

More specifically, the present invention relates to a machine for producing parts of foamed plastic, polyethylene, polypropylene and copolymer material.

BACKGROUND OF THE INVENTION

Machines of this sort are known to feature a supporting frame to which is fitted in a fixed position an injection station for receiving a first half-mold which is locked on to the injection station. The frame also supports a movable frame for supporting a second half-mold, and which is connected to the ends of a number of push rods for keeping the second half-mold perfectly parallel to the first half-mold, and for imparting to the second half-mold a relatively precise approach movement to couple and keep the two half-molds coupled along the whole of their respective peripheries at the injection station.

Known machines of the above type have several drawbacks, mainly due to the presence of the push rods, which prevent free access to the mold, thus complicating maintenance and replacements; transmit externally, i.e. on to the frame, both the forces applied to the half-molds and the forces generated inside the mold, so that relatively strong, high-cost frames must be used; and call for an extremely high degree of assembly and operating precision.

SUMMARY OF THE INVENTION

It is an object of the present invention to provide a machine for producing parts of foamed plastic material, designed to eliminate the aforementioned drawbacks.

According to the present invention, there is provided a machine for producing parts of foamed plastic material, the machine comprising a gantry-type frame; a first half-mold and powered carriage means supported by said frame; a second half-mold suspended from said carriage means and movable with the carriage means along said frame to impart to the second half-mold an approach movement towards, and a parting movement from, the first half-mold; and a number of electromagnets interposed between the two half-molds to lock the second half-mold to the first half-mold in a closed position forming an injection mold for the plastic material.

BRIEF DESCRIPTION OF THE DRAWINGS

A number of non-limiting embodiments of the invention will be described by way of example with reference to the accompanying drawings, in which:

FIGS. 1 and 2 show elevations of longitudinal sections of a preferred embodiment of the machine according to the present invention in two different operating positions;

FIG. 3 shows a larger-scale view of a detail in FIG. 2;

DETAILED DESCRIPTION OF THE INVENTION

Figure 1:
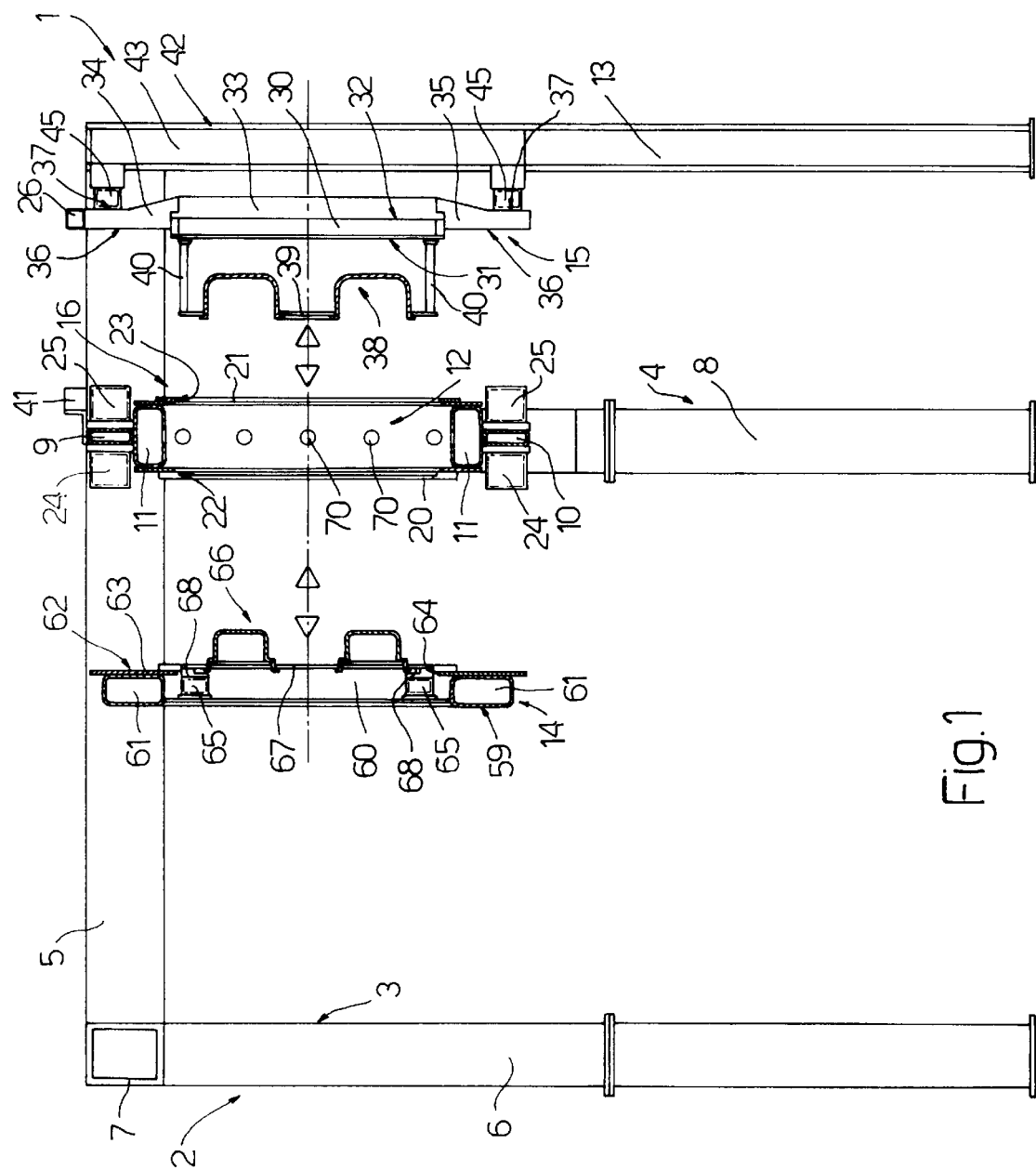

Number 1 in FIGS. 1 and 2 indicates as a whole a machine for producing parts (not shown) of foamed plastic material.

Machine 1 comprises a gantry-type frame 2 defined by two U-shaped end gantries 3 and 4 made integral with each other by two parallel horizontal top beams or rails 5, only one of which is shown in FIGS. 1 and 2. More specifically, gantry 3 comprises two uprights 6 joined at their top ends by a cross member 7 integral with rails 5 and lying, together with uprights 6, in a vertical plane perpendicular to rails 5. Similarly, gantry 4 comprises two tubular uprights 8 joined at their top ends by a cross member 9 integral with rails 5 and lying, together with uprights 8, in a vertical plane perpendicular to rails 5. Gantry 4 also comprises an intermediate cross member 10 which, together with top cross member 9, with two tubular beams 11 communicating with uprights 8 and integral with and parallel to cross members 9 and 10 respectively, and with the portions of the two uprights 8 extending between beams 11, defines a generally parallelepiped frame 12. In the example shown, frame 12 is substantially rectangular.

The two rails 5 project from gantry 4 and are supported, at their free ends, by a further two uprights 13 defining a further vertical plane parallel to the planes of gantries 3 and 4.

Figure 4:
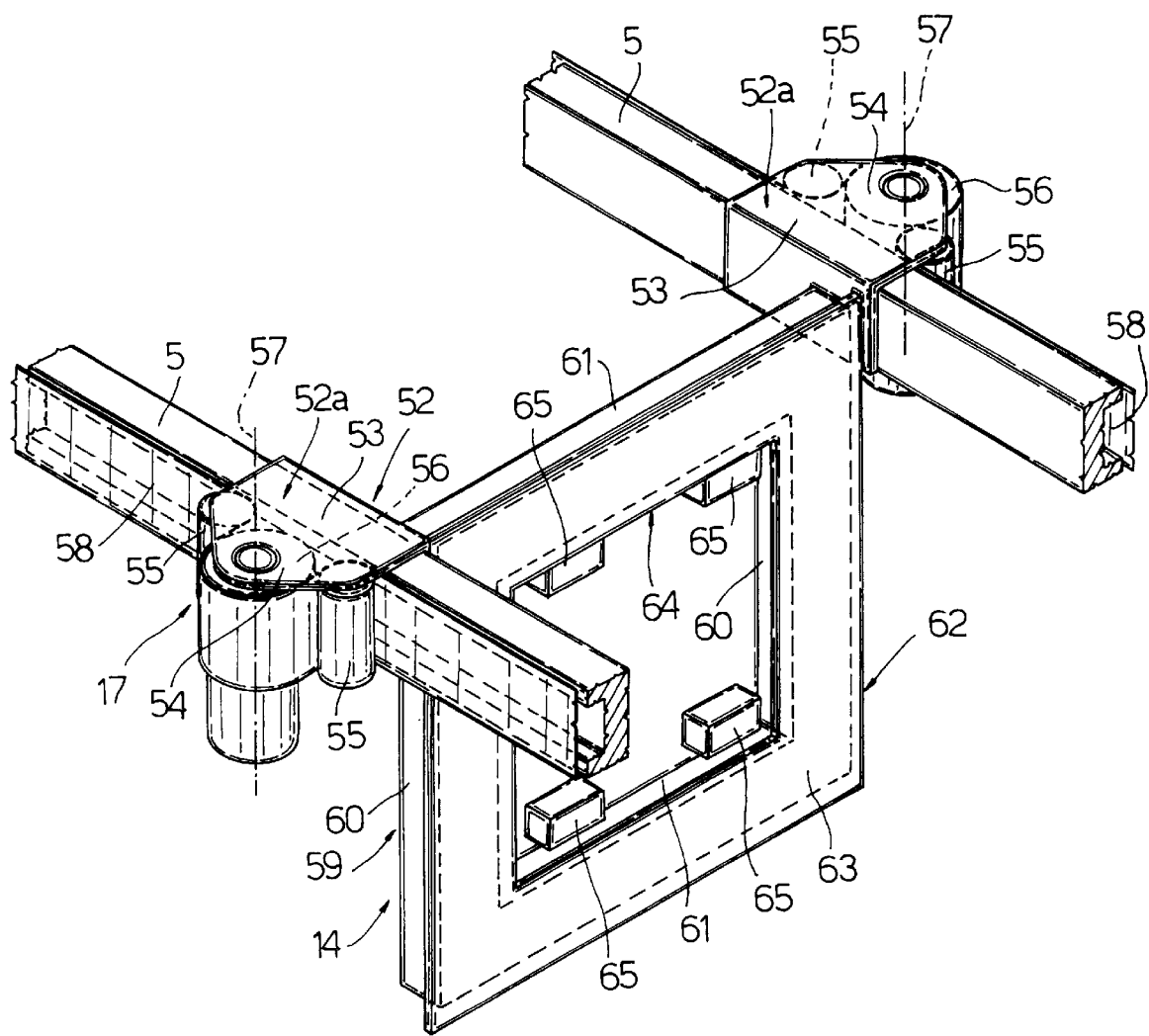
FIG. 4 shows a larger-scale view in perspective of a further detail of the FIG. 1 and 2 machine.
Figure 5:
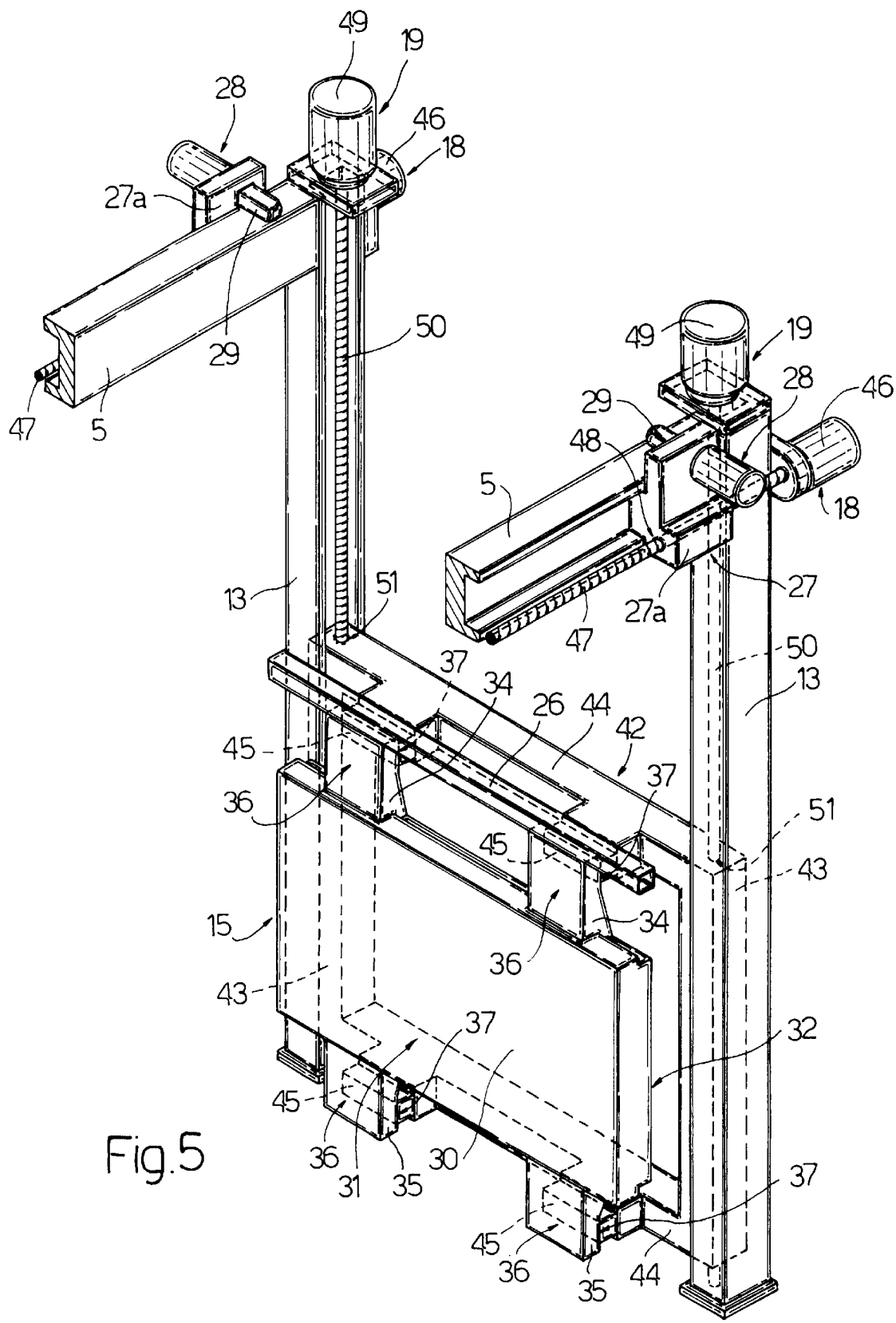
FIGS. 5 and 6 show larger-scale views in perspective, with parts removed for clarity, of a further detail of the FIG. 1 and 2 machine in two different operating positions.

Machine 1 also comprises two mold-holder frames 14 and 15, which are located on opposite sides of an injection station 16 carried by gantry 4 and substantially defined by frame 12, and are moved along rails 5 to and from station 16 by respective actuating devices 17 (FIG. 4) and 18 (FIG. 5). Frame 15 is also moved along uprights 13 between a lowered and a raised position by a further actuating device 19 (FIG. 5).

As shown more clearly in FIGS. 1 and 3, in addition to frame 12, station 16 also comprises two annular plates 20 and 21 having respective central openings 22 and 23, and connected integrally to frame 12 so as to be coaxial with each other and face frame 14 and frame 15 respectively; and two numbers of electromagnets 24 and 25 carried by cross members 9 and 10 and facing frame 14 and frame 15 respectively.

Figure 6:
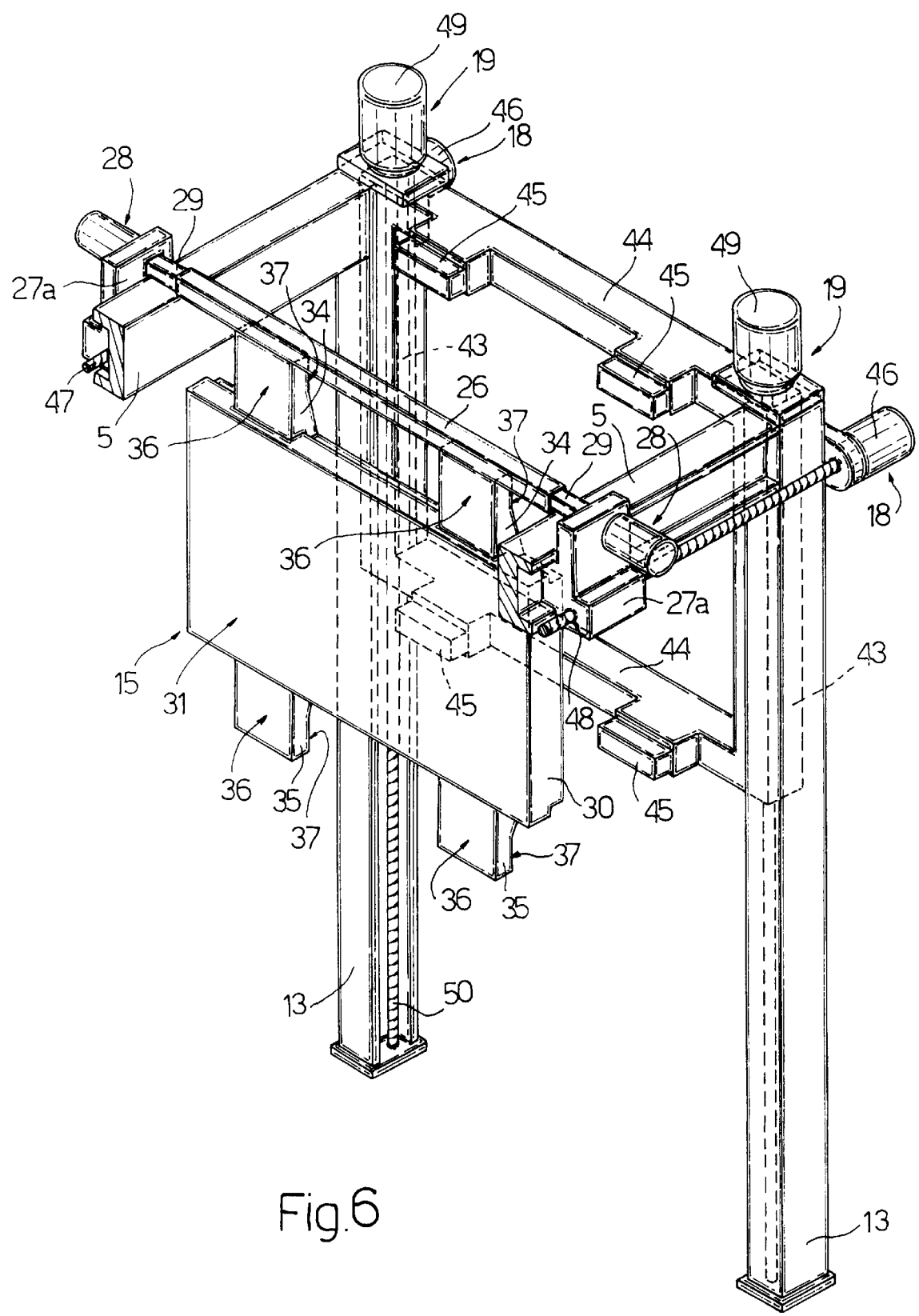

As shown more clearly in FIGS. 5 and 6, mold-holder frame 15 comprises a top tubular bar 26 parallel to cross members 7 and 9 and connectable releasably to a carriage 27 comprising two slides 27a, each of which is fitted to and slides, by virtue of actuating device 18, along the portion of respective rail 5 extending between gantry 4 and uprights 13. Each slide 27a comprises a connecting device 28 in turn comprising a powered pin 29 which moves axially to and from an engaged position in which pin 29 fits inside a respective end of bar 26 to make bar 26 integral with respective slide 27a.

Frame 15 also comprises a vertical, substantially rectangular bottom plate 30, an inner surface 31 of which faces gantry 3, and an outer surface 32 of which, opposite surface 31, is connected integrally to respective intermediate portions of two vertical reinforcing ribs 33, each of which has a top end portion 34 and a bottom end portion 35 which project with respect to plate 30. The two portions 34 and 35 are defined by respective vertical flat inner surfaces 36 coplanar with each other, and by respective vertical flat outer surfaces 37 also coplanar with each other; and the free ends of the two portions 34 are connected integrally to bar 26 to suspend frame 15 from bar 26.

As shown in FIGS. 1 and 2, frame 15 supports, in use, a female half-mold 38, which comprises a peripheral annular plate 39 connected removably to surface 31 of plate 30 by a number of horizontal rods 40, and so shaped and sized externally as to enable plate 39 to be inserted through opening 23 in plate 21 and rest, in use, against plate 20 without passing through opening 22.

Bar 26 faces a pad 41 located over rails 5 at station 16 and connected integrally to cross member 9, and is moved by actuating device 18 between a work position in which plate 39 of half-mold 38 contacts plate 20 of station 16 and bar 26 itself contacts pad 41, and a raised rest position in which frame 15 is connected to an auxiliary frame 42 fitted in sliding manner to uprights 13 and movable, by actuating device 19, between said raised rest position and a lowered loading position in which auxiliary frame 42 is substantially at floor level.

As shown in FIGS. 5 and 6, auxiliary frame 42 is substantially quadrangular, and comprises two vertical posts 43, each fitted in sliding manner to a respective upright 13 and connected to actuating device 19; and two cross members 44, which are arranged horizontally, join the corresponding ends of the two posts 43, and each support respective electromagnets 45, each of which is positioned facing surface 37 of a respective end portion 34, 35 of a respective rib 33.

As shown purely by way of example in FIGS. 5 and 6, actuating device 18 comprises two motors 46 connected to each other by an electrical axis (not shown) and for rotating respective screws 47, each of which is connected to a respective slide 27a by a screw-nut screw coupling 48.

Similarly, and again as shown purely by way of example in FIGS. 5 and 6, actuating device 19 comprises two motors 49 connected to each other by an electrical axis (not shown) and for rotating respective screws 50, each of which is connected to a respective post 43 by a screw-nut screw coupling 51.

As shown in FIGS. 1 and 2 and particularly in FIG. 4, mold-holder frame 14 is suspended from a carriage 52 comprising two slides 52a, each of which is fitted in sliding manner to a respective rail 5 and comprises a substantially U-shaped plate 53 partially surrounding respective rail 5 and extending outwards with two horizontal wings 54 defining a fork for supporting two transmission rollers 55 and a powered roller 56. Roller 56 is parallel to and located centrally with respect to rollers 55, and rotates about a vertical axis 57 located on the opposite side of respective rail 5 to frame 14. Each powered roller 56 is connected to the other roller 56 by an electrical axis (not shown), and is positioned with the periphery contacting a belt 58, which is fitted in a fixed position along relative rail 5, and extends between relative rail 5 and each of the two rollers 55, and between each roller 55 and roller 56.

As shown particularly in FIG. 4, mold-holder frame 14 comprises a tubular, substantially rectangular frame 59 defined by two vertical posts 60 extending downwards from and integral with respective slides 52a, and by two horizontal cross members 61 connecting the opposite ends of posts 60. Frame 14 also comprises a second frame 62 defined by an annular plate 63 integral with the surface of frame 59 facing station 16, and having a central, substantially rectangular opening 64 smaller in area than the opening defined by frame 59.

The cross members 61 of frame 59 each support two electromagnets 65 located a given distance from the surface of plate 63 facing frame 59.

As shown in FIGS. 1 to 3, frame 14 supports, in use, a male half-mold 66, which comprises a base plate 67, the surface of which opposite the surface supporting half-mold 66 is fitted with metal pads 68, each of which cooperates with a respective electromagnet 65 when plate 67 is set to a work position contacting the inner periphery of plate 63.

Operation of machine 1 will now be described as of the instant in which frame 14 is set to a withdrawn position at a given distance (FIG. 1) from injection station 16, auxiliary frame 42 is set to the lowered loading position (shown by the dash line in FIG. 2), and frames 42, 14 and 15 are empty.

As of the above condition, mold-holder frame 15, fitted with a half-mold 38, is positioned in front of auxiliary frame 42 with surfaces 37 contacting electromagnets 45, which are activated to lock frame 15 to frame 42. Similarly, a half-mold 66 is fitted to mold-holder frame 14 with pads 68 facing electromagnets 65, which are activated to lock half-mold 66 to frame 14.

In a variation not shown, carriage 52 comprises a lift device for moving frame 14 vertically between the raised work position shown in FIGS. 1 and 2, and a lowered position in which frame 14 is located close to the floor.

Actuating devices 18 and 19 are then activated to move frames 42 and 15 into the raised rest positions at the top of uprights 13, and to position pins 29 of carriages 27 coaxial with bar 26 of frame 15 in the raised position contacting frame 42. When connecting devices 28 are then activated and electromagnets 45 deactivated, pins 29 are inserted inside the opposite ends of bar 26 to connect frame 15 to carriage 27 and detach frame 15 from frame 42.

Actuating device 18 is then activated to move frame 15 towards station 16 and insert half-mold 38 through opening 23 so that bar 26 contacts pad 41, plate 39 substantially contacts plate 67, and surfaces 36 of frame 15 substantially contact electromagnets 25, which, when activated, provide for mating frame 15 with station 16 and locking frame 15 to station 16 in the work position shown in FIGS. 2 and 3.

In connection with the above, it should be pointed out that half-mold 38 and respective mold-holder frame 15 are simply suspended from carriage 27 and therefore freely accessible from underneath for maintenance and cleaning. Moreover, the approach movement imparted by carriage 27 need not be particularly accurate, by virtue of the work position of half-mold 38 in station 16 being determined, not by carriage 27 and respective actuating devices 18, but by electromagnets 25. Finally, all the forces exchanged between station 16 and frame 15 in the work position are internal forces which are not transmitted to frame 2.

Once locked in position on to station 16, frame 15 defines, together with frame 12, a substantially airtight chamber 69 communicating, through holes 70 formed in frame 12, with a device (not shown) for emitting steam at relatively high temperature and pressure.

At this point, actuating device 17 is activated to move frame 14 and respective half-mold 66 towards station 16, so that plate 67 substantially contacts electromagnets 24, which, when activated, provide for mating frame 14 with station 16 and locking frame 14 to station 16 in the work position shown in FIGS. 2 and 3.

In this case also, it should be pointed out that half-mold 66 and respective mold-holder frame 14 are simply suspended from carriage 52 and therefore freely accessible from underneath for maintenance and cleaning. Moreover, the approach movement imparted by carriage 52 need not be particularly accurate, by virtue of the work position of half-mold 66 in station 16 being determined, not by carriage 52 and respective actuating devices 18, but by electromagnets 24. Finally, all the forces exchanged between station 16 and frame 14 in the work position are internal forces which are not transmitted to frame 2.

Once locked in position to station 16, half-mold 66 defines, together with half-mold 38, a mold 71, an inner chamber 72 of which communicates with chamber 69 through holes (not shown) formed through half-mold 38, and with a device (not shown) for supplying foamed plastic material and connected in known manner to half-mold 38.

Once the plastic material is injected and sintered inside mold 71, electromagnets 24 are deactivated, and the actuating device is activated to withdraw frame 14 and respective half-mold 66 from station 16 to unload the molded part; frame 14 and respective half-mold 66 are then moved back into station 16 for the next molding operation.

In a first variation (not shown) of machine 1 described above, rails 5 terminate at gantry 4, and the portion of frame 2 to the right of station 16 in FIGS. 1 and 2 is dispensed with entirely. In which case, frame 15 and respective half-mold 38 are moved into station 16 by external lifting means (not shown) independent of machine 1.

In a further variation (not shown), frame 14 supports half-mold 38, and frame 15 supports half-mold 66.

Figure 7:
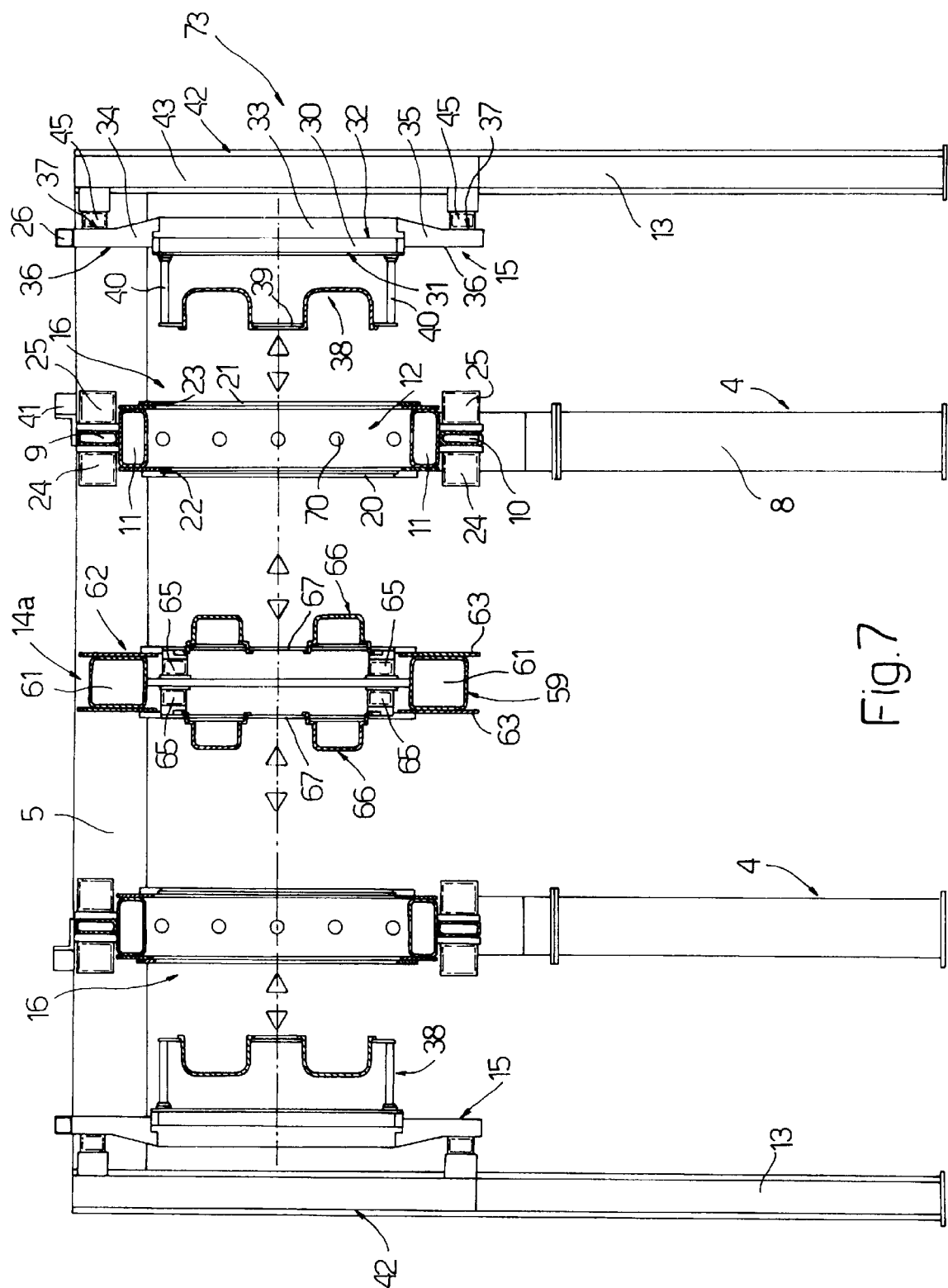
FIG. 7 shows the same view as in FIG. 1, of a variation of the FIG. 1 and 2 machine.

The FIG. 7 variation relates to a machine 73 similar to machine 1 and wherein frame 2 supports two stations 16; two frames 15 located outwards of the two stations 16 and each supporting respective half-mold 38 facing the adjacent station 16; and one frame 14a, which differs from frame 14 of machine 1 solely by supporting two opposite numbers of electromagnets 65 for connecting integrally to frame 14a two half-molds 66, each facing the adjacent station 16.

Frame 14a of machine 73 travels along rails 5 to mate alternately with the two stations 16 and so reduce downtime and substantially double output.

What is claimed is:

1. A machine (1; 73) for producing parts of foamed plastic material, the machine (1; 73) comprising a gantry-type frame (2); at least one first (66) and one second (38) half-mold suspended from said frame (2), at least one of said half-molds (38, 66) being movable along said frame (2) to perform an approach movement towards, and a parting moving from, the other said half-mold; and a number of electromagnets (24, 25) interposed between the two half-molds (38, 66) to lock the second half-mold (38) to the first half-mold (66) in a closed position forming a mold (71) for injecting the plastic material.

2. A machine (1; 73) as claimed in claim 1, comprising at least one injection station (16) located along said frame (2); and a first and at least one second (15) mold-holder frame suspended from said frame (2) to respectively support at least said first (66) and a respective said second (38) half-mold on opposite sides of said injection station (16); at least one said mold-holder frame (14) comprising locking means (65) for locking the relative half-mold (66) to the mold-holder frame (14); and said number of electromagnets (24, 25) being carried by said injection station (16) to lock the first (14) and the second (15) mold-holder frame to the injection station (16) with the interposition of said two half-molds (38, 66) connected to each other to define a mold (71) for injecting and sintering plastic material.

3. A machine (1; 73) as claimed in claim 1, comprising two injection stations (16) located along said frame (2); and one first (14) and two second (15) mold-holder frames suspended from said frame (2); said first mold-holder frame (14) being interposed between said two injection stations (16) and supporting two opposite said first half-molds (66); each said second mold-holder frame (15) supporting a respective said second half-mold (38) on the opposite side of the relative said injection station (16) with respect to the relative said first half-mold (66); at least said first mold-holder frame (14) comprising locking means (65) for locking each first half-mold (66) to the first mold-holder frame (14); and said number of electromagnets (24, 25) being carried by each said injection station (16) to lock the first (14) and the relative second (15) mold-holder frame to the injection station (16) with the interposition of the relative two half-molds (38, 66) connected to each other to define a respective mold (71) for injecting and sintering plastic material.

4. A machine (1; 73) as claimed in claim 2, wherein said number of electromagnets (24, 25) comprise a first (24) and a second (25) number of electromagnets carried by said injection station (16) and located on opposite sides of the injection station (16) to cooperate with said first (14) and said second (15) mold-holder frame respectively.

5. A machine (1; 73) as claimed in claim 3, wherein said locking means comprise a relative third number of electromagnets (65) carried by the first mold-holder frame (14) and cooperating with the relative first half-mold (66).

6. A machine (1; 73) as claimed in claim 2, comprising, for at least one of said mold-holder frames (14, 15), a carriage (52; 27) fitted in sliding manner to said frame (2); and actuating means (17; 18) for moving said carriage (52; 27) along said frame (2) to and from said injection station (16).

7. A machine (1; 73) as claimed in claim 6, wherein said actuating means (17) comprise at least one powered roller (56) carried by said carriage (52); and a belt (58) located in a fixed position along said frame (2) and wound about a portion of the periphery of said powered roller (56).

8. A machine (1; 73) as claimed in claim 1, comprising at least one auxiliary frame (42) for supporting a respective said second mold-holder frame (15) and movable vertically on said frame (2) between a lowered loading position in which said second mold-holder frame (15) and the relative second half-mold (38) are loaded on to the auxiliary frame (42), and a raised position in which said second half-mold (38) is positioned facing the relative said injection station (16); said auxiliary frame (42) comprising further locking means (45) for releasably locking said second mold-holder frame (15) to the auxiliary frame (42).

9. A machine (1; 73) as claimed in claim 8, wherein said further locking means (45) comprise electromagnets (45).

* * * * *